(12) United States Patent
Heller

(10) Patent No.: US 12,118,104 B2
(45) Date of Patent: *Oct. 15, 2024

(54) METHOD OF SECURE DATA STORAGE AND TRANSFER

(71) Applicant: Patrick Scott Heller, Goshen, IN (US)

(72) Inventor: Patrick Scott Heller, Goshen, IN (US)

( * ) Notice: Subject to any disclaimer, the term of this patent is extended or adjusted under 35 U.S.C. 154(b) by 391 days.

This patent is subject to a terminal disclaimer.

(21) Appl. No.: 17/457,532

(22) Filed: Dec. 3, 2021

(65) Prior Publication Data

US 2022/0092200 A1    Mar. 24, 2022

Related U.S. Application Data

(63) Continuation-in-part of application No. 16/711,650, filed on Dec. 12, 2019, now Pat. No. 11,196,718.

(51) Int. Cl.
*G06F 21/62* (2013.01)
*G06F 3/06* (2006.01)
*G06F 21/60* (2013.01)
*G06F 21/78* (2013.01)

(52) U.S. Cl.
CPC ........ *G06F 21/6209* (2013.01); *G06F 3/0622* (2013.01); *G06F 3/0659* (2013.01); *G06F 3/0673* (2013.01); *G06F 21/602* (2013.01); *G06F 21/78* (2013.01)

(58) Field of Classification Search
CPC ............. G06F 21/6245; G06F 21/6209; G06F 3/0659; G06F 3/067; G06F 3/0623; G06F 3/0673; G06F 3/0658; G06F 3/0622; G06F 21/602; G06F 21/606; G06F 21/78; G06F 2221/2123; H04L 63/0428
USPC .......................................................... 713/168
See application file for complete search history.

(56) References Cited

U.S. PATENT DOCUMENTS

| | | | |
|---|---|---|---|
| 7,757,278 B2 * | 7/2010 | Boneh | H04L 63/0428 380/255 |
| 9,225,695 B1 * | 12/2015 | Riera | H04L 63/101 |
| 11,171,959 B2 * | 11/2021 | Wu | H04L 63/10 |

* cited by examiner

*Primary Examiner* — Amare F Tabor
(74) *Attorney, Agent, or Firm* — BOTKIN & HALL, LLP; Michael D. Marston, Esq.

(57) ABSTRACT

A method of secure data transfer and storage using ae storage device storing encrypted information. The method uses a host that stores and transfers encrypted sensitive information and a customer that desires the information to be securely stored. The customer chooses a unique encryption code to encrypt sensitive information and uploads the information to a host. Then the host transfers the information to the storage device. Connections between the host and customer are intermittent and done so the storage device remains isolated from networks outside of the host.

11 Claims, 4 Drawing Sheets

METHOD OF SECURE DATA STORAGE AND TRANSFER

CROSS REFERENCE TO RELATED APPLICATIONS

This application is a Continuation-in-Part of and claims the benefit of priority from U.S. patent application Ser. No. 16/711,650, filed on Dec. 12, 2019, the entire contents of which are incorporated herein by reference.

BACKGROUND OF THE INVENTION

This present disclosure relates to information stored on computer disks, USB devices, and removable storage. There are multiple ways data can be destroyed, compromised, or damaged. Data can be destroyed through hardware failure, such as a hard drive crash or power surge, or through fire, flood, or mechanical force. Data stored on networked computers can also be compromised through hacking over the internet. It can also be compromised by careless behavior such as leaving a computer logged in and unattended, leaving an unsecured laptop out where it can get stolen, or losing a USB flash drive with sensitive information stored on it. Some systems and methods attempt to solve these problems, but often fall short. There are encryption algorithms to prevent a loose flash drive from being read, antivirus software to reduce the chances of a cyberattack, and enclosures to prevent destruction from fire, flood, or mechanical damage. Each system has individual vulnerabilities. An improved method is needed.

SUMMARY OF THE INVENTION

The present disclosure describes a method of using an air-gapped computer system in concert with ruggedized encrypted on-site storage and portable encrypted storage. The method involves transfer of information from a customer's location to the secure location. The files are encrypted at the customer's location and sent over a secure connection. An intermittently gapped host computer is selectively isolated from any network outside of the host and can receive information from the customer over the secure connection. The intermittently gapped host computer may be connected to a storage device only when the intermittently gapped host computer is isolated from any network outside of the host. File transfer occurs between the on-site storage and removable storage only on the air-gapped computer system. The on-site storage retains previous versions of information.

BRIEF DESCRIPTION OF THE DRAWINGS

A preferred embodiment of this invention has been chosen wherein.

DESCRIPTION OF THE PREFERRED EMBODIMENT

Figure 1:
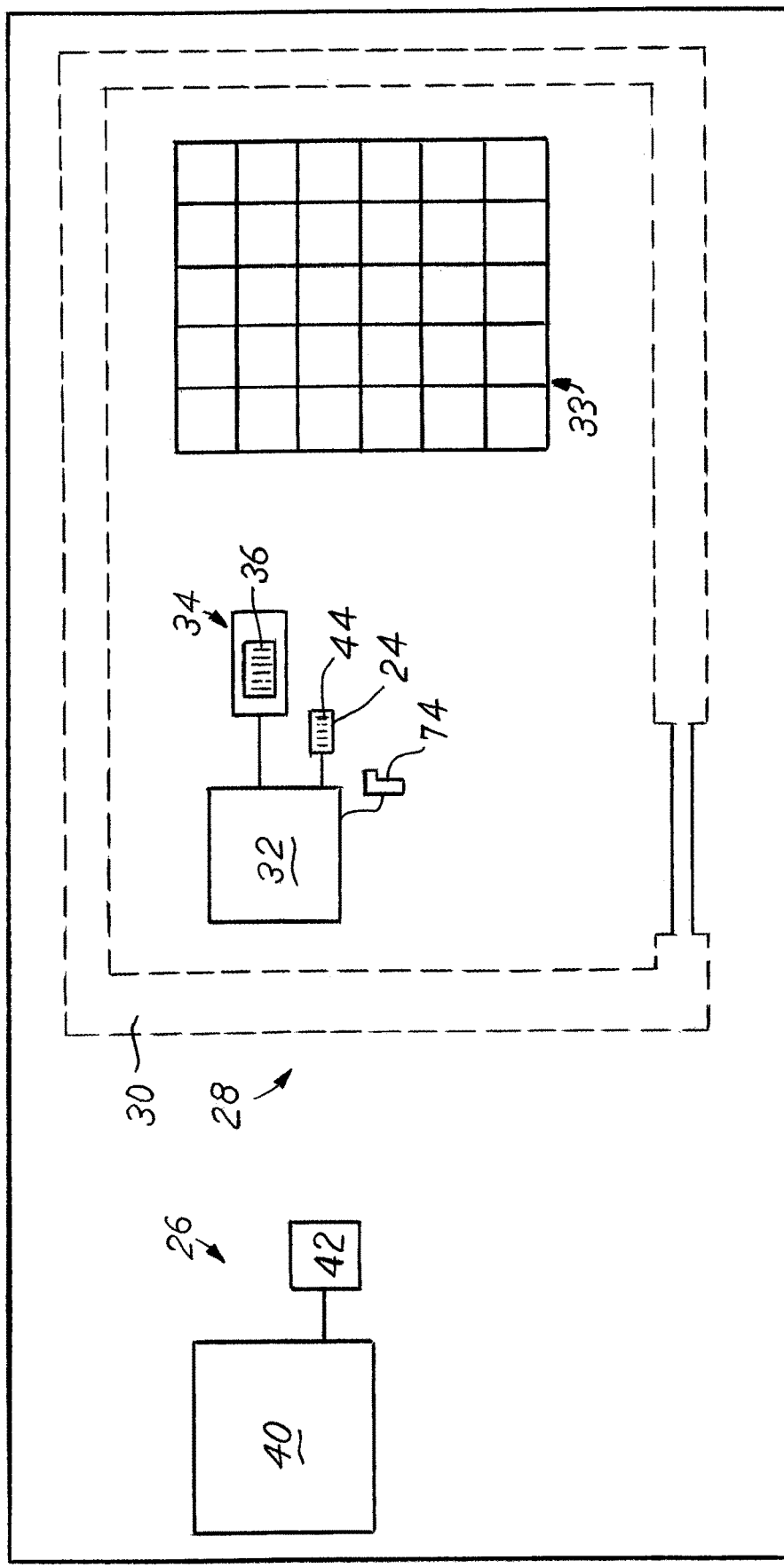
FIG. 1 is a diagram of the system at the host.
Figure 2:
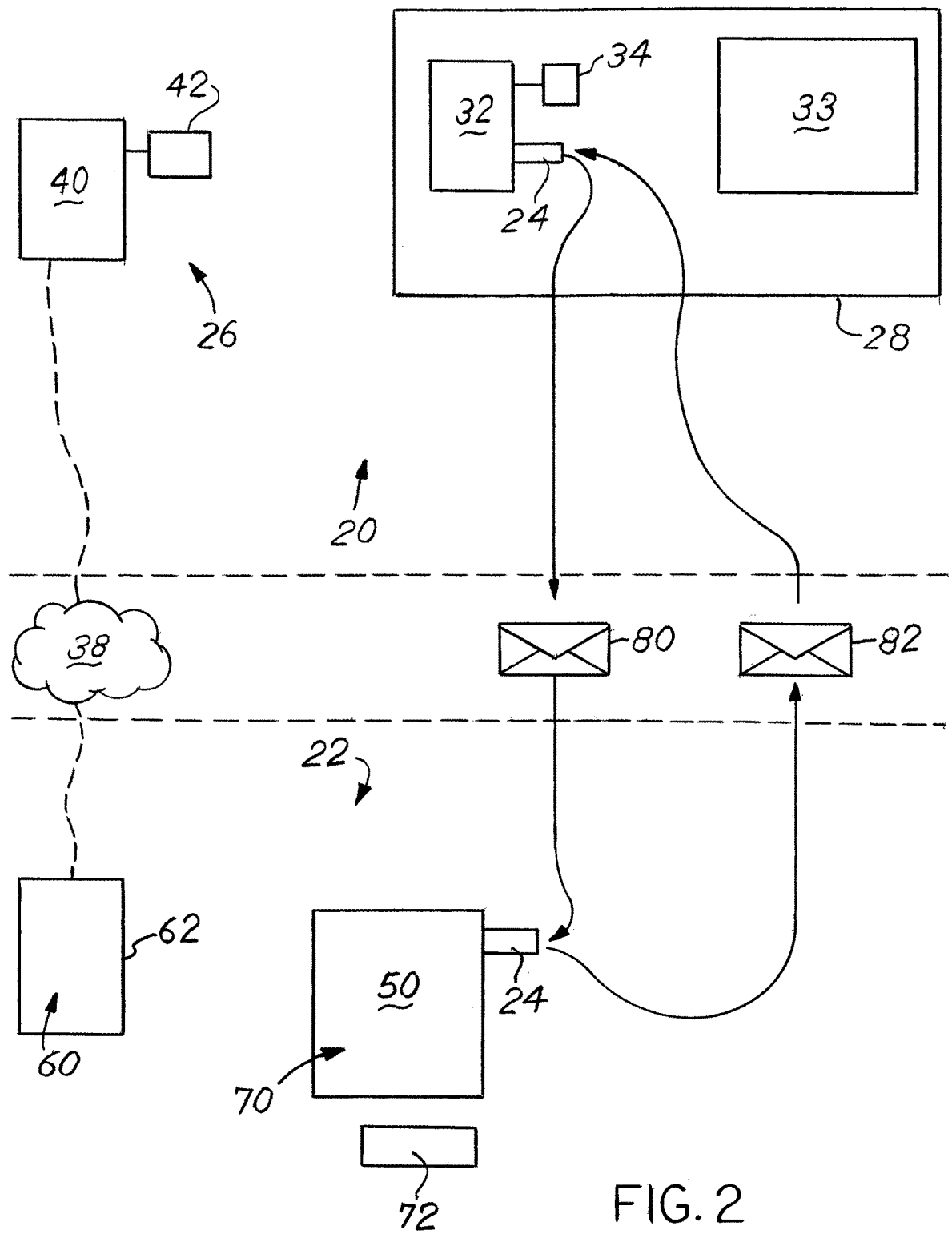
FIG. 2 is an overall diagram of the systems at the host, customer, and the flow of information between them.
Figure 3:
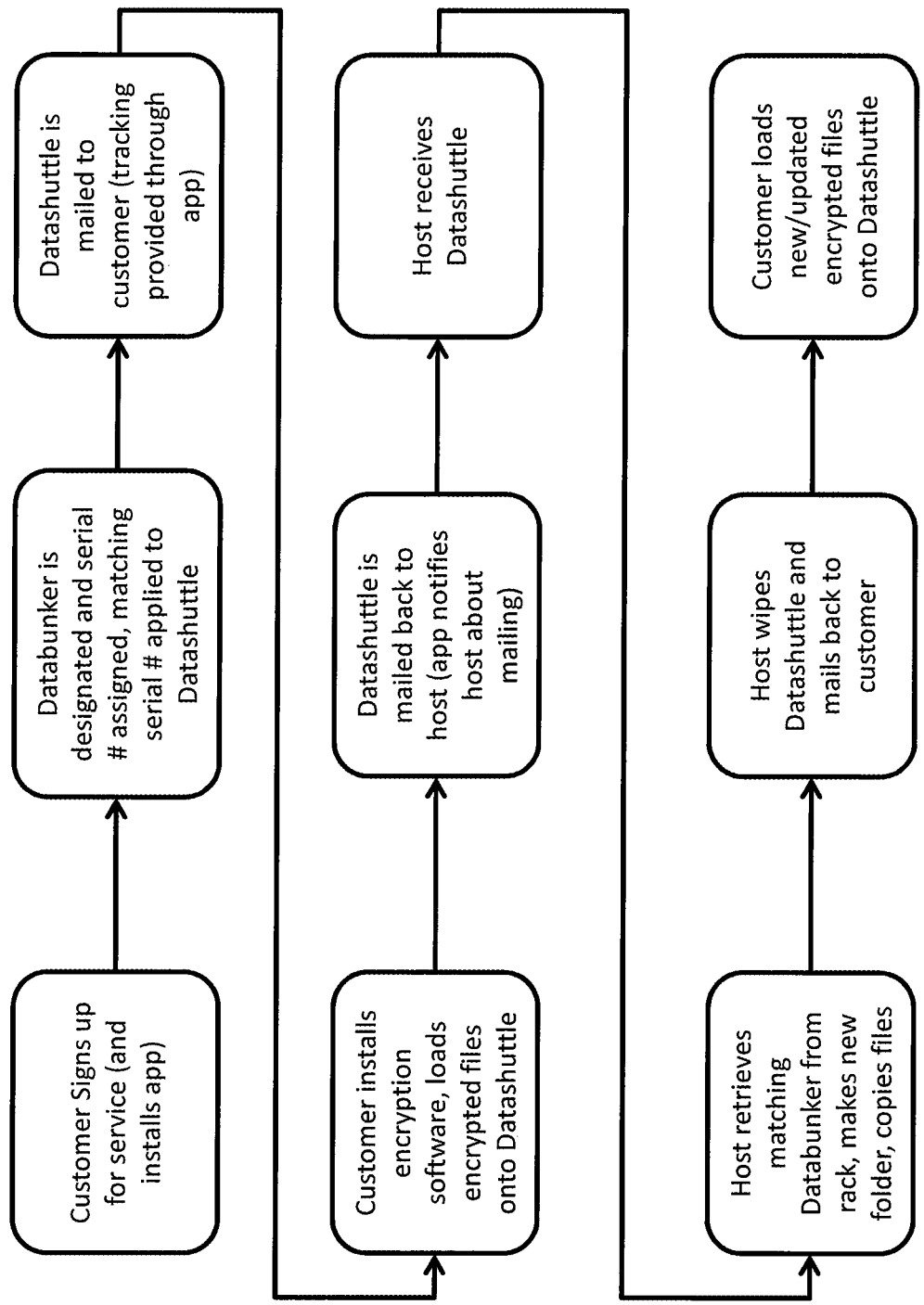
FIG. 3 is a flow diagram for when the customer sends sensitive information to the host.

An apparatus and method of securely storing and updating information is described herein, involving a host 20, a customer 22, and the physical transportation of a removable device 24. The removable device 24 is made to withstand rough handling and may incorporate ruggedizing materials and manufacturing. For example, the removable device 24 may be integrated into a durable and/or resilient enclosure. The enclosure may include padding, other mechanical shock protection, and/or protection from moisture. The host 20 is the secured location where sensitive information is stored and archived. The customer 22 is located separately from the host 20 and has data that the customer desires to be securely backed up. Sensitive information is transferred between the host 20 and customer 22 completely offline, meaning the mail, hand-delivery, courier, or other method that is completely separate from any computer network. All file transfer and storage outside of the customer is encrypted and inaccessible without a customer-chosen unique encryption key 72. Any intercept of the removable device 24 by an unauthorized user will result in unreadable and inaccessible information without the encryption key 72.

The host 20 is a secure location and has a connected area 26 and an air-gapped area 28. While they are shown adjacent, the connected and air-gapped areas 26, 28 may be separate buildings, locations, or rooms. The connected area 26 is connected to the internet 38 but may have restricted access. The restricted access may include physically restricting access and/or restricting computer and network access. The air-gapped area 28 is completely separate from any outside communications and is surrounded by an "air-gap" 30, meaning there is no internet, intranet, or other network connectivity to any devices contained inside the area 28. The air-gapped area 28 is protected from outside unauthorized access at the host 20. The protection may be in the form of lock and key, key cards, physical keys, access codes, RFID tags, or other systems to restrict physical access to the air-gapped area 28. Located inside the air-gapped area 28 is an array 33 of armored storage units 34, each having their own barcoded serial number 36 or other unique identification. The armored storage units 34 described herein are metal enclosures with extreme heat-resistant insulation and components, but it is contemplated that other types of storage devices are used, such as removable hard drives or other storage media. It is contemplated that the armored storage units 34 are stored in fire resistant enclosures. The air-gapped area 28 may be supplied by an independent power source, backup generator, or otherwise be connected to an off-grid supply of power. The air-gapped area 28 further contains a gapped host computer 32 that may be located adjacent the array 33 or in a separate location. The gapped host computer 32 is completely standalone from any computer network, including any computer network at the host. Further, the gapped host computer 32 may contain a custom operating system, software, or firmware that is used for copying and updating sensitive information between the storage unit 34 and removable storage device 24. The storage units 34 are normally in a disconnected state and reside in the storage array 33, where no electricity is present and no communication to the storage unit 34 can occur. The storage units 34 are rugged and are protected from high heat, mechanical damage, liquid intrusion, and electrical events. Each storage unit 34 has a rigid metal shell with a tight-fitting lid. Inside the metal shell is high-temperature insulation that surrounds a storage unit. The storage unit may include phase-change heat absorbers that surround a solid-state storage device. Sacrificial wiring connects the solid-state storage device through a small gap in the rigid metal shell. In the event that there is a fire, flood, earthquake, collapse, or other damaging event inside the air-gapped area 28, each storage unit 34 is individually protected. This is in contrast to a server or drive array that relies on protection supplied by the room or area where it is installed. In a server or drive array, a flood or fire could easily cause destruction of all data and hardware.

The connected area 26 has an internet-connected host computer 40. For simplicity, the internet-connected host computer 40 is shown and described as a single computer, but the internet-connected host computer 40 can be a network or series of computers that may be completely located at the host or hosted off-site. There is no communication between the internet-connected host computer 40 and the gapped host computer 32. The internet-connected host computer 40 has a barcode printer 42, which is located at the host 20. The connected host computer 40 may have a database that stores customer information, such as the mailing address, billing information, file transfer log, serial number/ID of their storage unit 34.

The customer has its own computer 50 or computer network that uses sensitive information. The sensitive information may be stored on a network drive, attached storage, or on the computer(s) directly. The customer's computer 50 may be connected to the internet 38 or also be air-gapped. Sensitive information can include trade secrets, banking information, programs, personnel records, accounts and passwords, databases, or any type of electronic files or information that may be important to the customer. The term "sensitive information" is used as a definition for the files that are stored and transferred between the host and customer and is not limiting to the types of files that are stored, encrypted, and transferred. While the files are commonly sensitive or contain sensitive information, the files can also be ordinary and/or publicly-available.

An app 60 may be provided by the host that the customer installs on a device 62 that is connected to the internet 38. This is commonly a smartphone, tablet, or other mobile device. The app 60 communicates with the connected host computer 40 through the internet 38 and is used to initiate the offline transfer of sensitive information. The app 60 also is used to track any shipment/delivery of the removable storage device 24. Alternatively, the customer 22 may contact the host computer 40 through the internet via web portal, phone call, or email. The customer installs encryption software 70 and chooses a unique encryption key 72 that is not shared with anyone at the host 20. Without the encryption software 70 and key 72, the sensitive information is completely inaccessible, even by the host 20. If the customer 22 loses the encryption key 72, the data is inaccessible.

The gapped host computer 32 may include a barcode reader 74 to document and ensure that the barcodes 36, 44 match before any file transfer. Because the files are not readable by the host, ensuring matching serial numbers prevents errors and loss of information.

There are different scenarios when transferring sensitive information. These include, but are not limited to, the following: initial load, updating, and restoration. In the initial load, the sensitive information is only at the customer's computer 50 and no sensitive information is present at the host 20. When updating, the sensitive information at the customer's computer 50 has been updated or changed, and the customer desires the updated sensitive information to be stored at the host. During restoration, the sensitive information has been compromised or destroyed and the sensitive information stored at the host 20 is the only trusted copy. Alternatively, the customer 22 desires to move it to a new computer or network. In all scenarios, the sensitive information never travels between the host and customer via a computer network or the internet. The files are only transferred by physical delivery.

For the initial load, the customer 22 contacts the host for a blank removable device 24. The connected host computer 40 prints out a unique barcode 44 that is tied to that customer and a designated storage unit 34. The unique barcode 44 matches on the removable device 24 and storage unit 34. The barcode 44 is applied to the blank removable device 24 and then the host 20 places the blank device 24 in the mail 80 to the customer. The mail 80 is tracked by the host 20 to ensure safe delivery to the customer 22. The customer 22 installs encryption software 70 and chooses an encryption key 72. If the encryption key 72 is lost, any encrypted information is inaccessible. Upon receipt of the removable device 24, the customer 22 connects the blank removable device 24 to the customer computer 50 and enters the encryption key 72. The customer 22 encrypts and loads all sensitive information onto the removable device 24. This takes the sensitive information and transforms it to encrypted sensitive information as it is being loaded onto the removable device 24. Upon completion, the customer 22 then mails 82 the removable device 24 to the host 20. The host 20 tracks the package, either through the app 60 or being otherwise notified by the customer 22. The sensitive information on the removable device 24 is encrypted. When the removable device 24 arrives at the host 20, the barcode is scanned at the connected host computer 40 to tie it to the customer's account. The removable device 24 is never connected to the connected host computer 40, only the gapped host computer 32. The host 20 identifies the correct armored storage unit 34 in the gapped area 28. The armored storage unit 34 and removable device 24 are connected to the gapped computer 32 and the encrypted files are copied from the removable device 24 to the armored storage unit 34. After file transfer is complete, the armored storage unit 34 is disconnected and placed back in the array 33. The host cannot access files on either device 24, 34 due to the encryption. The removable device 24 is then wiped clean of information and mailed back to the customer. The customer 22 may be notified through the app that the transfer is complete and the blank removable device 24 is on its way back to them.

To update the sensitive information, the customer 22 takes the removable device 24 and loads encrypted sensitive information onto the removable device 24. The customer then notifies the host 20 through the app 60 and mails 82 the removable device to the host 20. When the host 20 receives the removable device 24, the encrypted files are copied from the removable device 24 to the armored storage unit 34. A new folder is added to the armored storage unit 34 with the updated information. Each time the sensitive information is updated, a new folder is created to allow previous versions of sensitive information be retrievable by the customer in the event one version of the sensitive information is corrupted or otherwise compromised. It is contemplated that alternate methods of saving and retrieving versions of sensitive information are used.

To restore sensitive information, the customer 22 contacts the host 20 through the app 60. The host may either load a new removable device 24 with sensitive information or mail 80 the armored storage unit 34 back to the customer 22. As with other mailing or shipping, the progress is tracked through the app 60.

Figure 4:
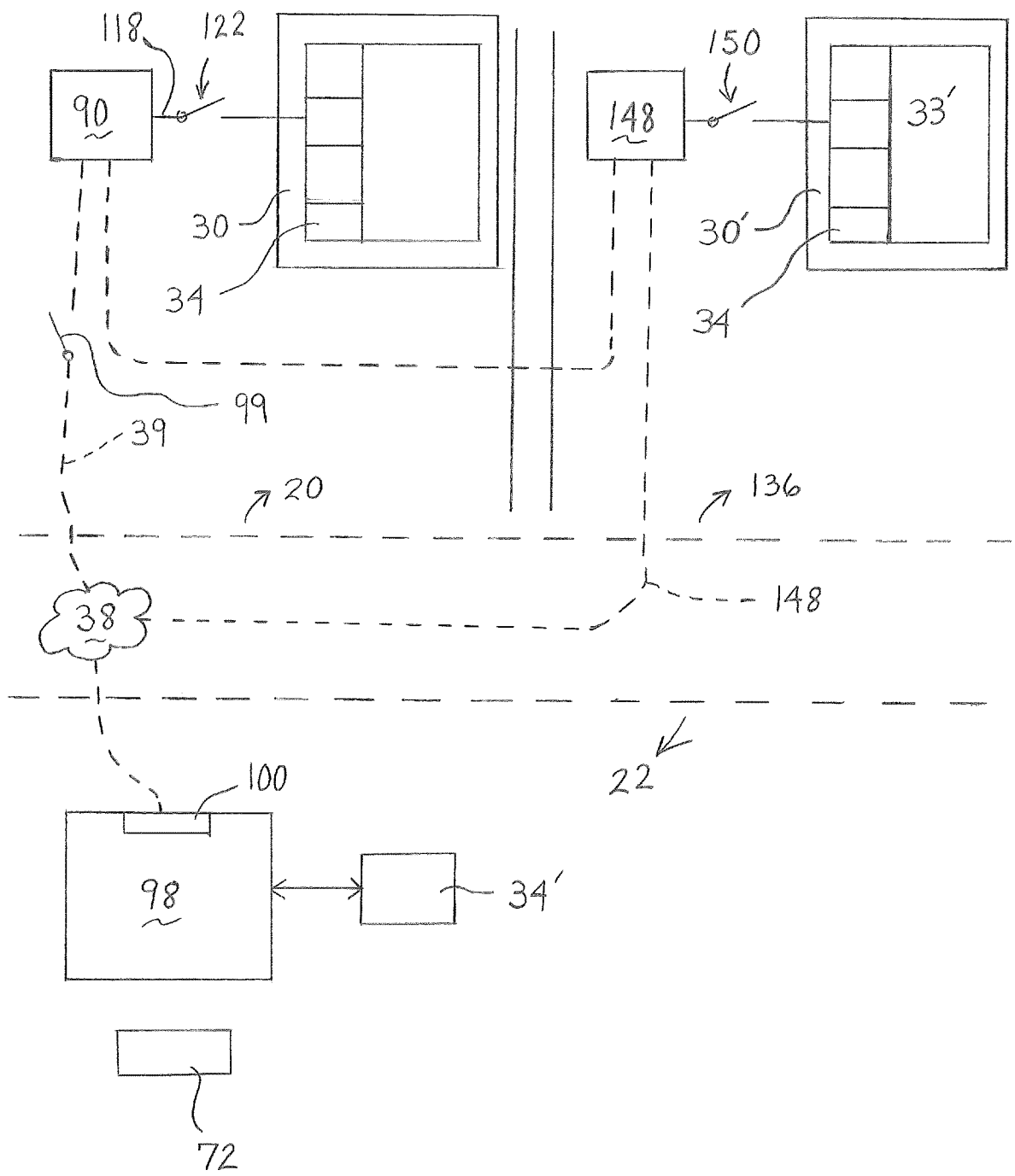
FIG. 4 is a block diagram of how data is transferred when an internet connection is used with an intermittently gapped host computer.

In some instances, sensitive information may be transferred between the host 20 and the customer 22 through a secure online connection. This is shown in FIG. 4. In this case, the host 20 is located in a secure location and has an intermittently connected host computer 90 located with the host 20. The intermittently connected host computer 90 is connected to the internet 38 via a secure connection 39. The secure connection may include SSL. The secure connection 39 to the internet 38 is between a device 98 located with the customer 22 and the intermittently connected host computer 90. The information leaving the device 98 is encrypted 100 before it leaves the customer 22. The device 98 at the customer 22 may be a computer or local cloud and may even be a network of computers. Once the information is encrypted 100, that information may only be viewed by using a key 72 that the customer 22 retains. In addition to the information being encrypted before it leaves the customer 22, the information may be encrypted at a server on the internet 38 between the device 98 at the customer 22 and the intermittently connected host computer 90. Thus, any information that may be potentially intercepted on the internet 38 would be unreadable without the key 72 and that is still true if the information were decrypted during its time on the internet 38 because such decryption would only be for the second layer of encryption. The device 98 may include special software that strictly limits the amount of time information is sent via the internet 38. For instance, the software on the device 98 may intermittently transmit information through the internet 38 by only activating a connection to the internet 38 on a predetermined time interval. The software may be set up to send information on the internet 38 once every five minutes in a burst of packets. Such transmissions periodically limit the amount of time the information spends in transit on the internet 38 and minimizes the time it may be intercepted. The user of the device 98 may select the interval of each transmission of information to a longer or shorter time. Such a choice for the predetermined time interval before sending information via the internet 38 would depend on the user and a shorter time interval before sending information would limit the amount of time information is not synchronized with the intermittently host computer 90. In addition to the user limiting the amount of time information is transmitted over the internet 38 at the device 98, the intermittently connected host computer 90 may do so as well. Before connecting to the intermittently connected host computer 90, a login is required to make that connection. The intermittently connected host computer 90 also has the capacity to monitor activity from a customer 22 connecting to it or attempting to connect to it. In the absence of activity, the intermittently connected host computer 90 could time the customer 22 out after a predetermined time thereby breaking the connection to the internet 38 to minimize the time the intermittently connected host computer 90 and the device 98 are connected.

The intermittently connected host computer 90 retains a serial number 110 that is provided to the customer 22 and also associated with an armored storage unit 34. The armored storage unit 34 having a corresponding serial number 110 associated with a particular customer 22 is stored in an array 33 of armored storage units 34. Each armored storage unit 34 has its own barcoded serial number 110 or other unique identification. As described above, the array 33 of armored storage units 34 are stored in an air-gapped area 28. Each armored storage unit 34 is an extremely durable unit that has the capacity to survive many types of disasters including fire, flood, or most types of damaging event that would destroy a less durable storage device.

The intermittently connected host computer 90 has an intermittent connection to the customer 22 and also has an intermittent connection to storage units 34 that correspond to particular customers 22. An intermittent connection 118 is made to each storage unit 34 within the array 33. The intermittent connection 118 is gapped via the use of a switch 122 or other gapping device that does not leave the storage unit 34 connected while the intermittently connected host computer 90 is connected to the customer 22 via the internet 38. The switch 122 may be a relay or other type of switch that is electrically controlled to physically break the connection 118 between the intermittently connected host computer 90 and the storage units 34 within array 33. Each armored storage unit 34 must be connected to the intermittently connected host computer 90 through a switch 118 and although only one switch 118 is shown, there may be many switches connecting the intermittently connected host computer 90 to each storage unit 34 within the array 33. In this manner, there is a physical break between each storage unit 34 and the world outside of the air-gapped area 30. Generally, for a fully gapped air-gapped area, no switch 122 to any one of the storge units 34 in the air-gapped area will be connected while the intermittently connected host computer 90 is connected to the internet 38. In other words, if the connection to the internet 38 is viewed as a switch that is closed when the intermittently connected host computer 90 is connected to the internet, the switch 122 is open so that the air-gapped area 30 remains truly air gapped. More simply stated, the switch 122 will never be closed when the intermittently connected host computer 90 is connected to the internet 38. The intermittently connected host computer 90 may be configured to store information from particular customers 22 it receives throughout a time period, then for a select timeframe deny all connections to the internet 38 so that switches 122 to particular storage units 34 corresponding to customers 22 who sent information may be transferred through the connection 118 into the air-gapped area 30. In this manner, the air-gapped area may be truly air-gapped because no computer or device connected to a storage unit 34 is connected to the internet 38 or any other network when information is being transferred to the storage unit 34. As such, although the intermittently connected host computer 90 may at times be connected to the internet 38, it is not connected to the internet 38 when it is connected to a storage unit 34. Therefore, the intermittently gapped host computer is selectively isolated from any network to facilitate secure transfer of information to the storage units 34. To add a further layer of security, the intermittently connected host computer 90 may have a switch 99 to affirmatively break its connection to the internet 38 and provide the intermittently connected host computer 90 an air-gapped connection. The storage units 34 are always isolated from any network. The delay that the intermittently connected host computer 90 has while it holds information before being transferred to a corresponding storage unit 34 may be set to a predetermined time. If all information received via the internet 38 at the intermittently connected host computer 90 that is destined for a particular storage unit 34 is updated via connection 118 after the normal business hours of the host 20 during the night, a customer 22 seeking to retrieve his particular storage unit 34 the next morning can be assured that it will contain the information sent on the previous day. The general purpose of the network shown in FIG. 4 is to have a nearly continuously updated version of the device 98 located at the customer 22 to be replicated on the storage unit 34. In addition to the storage unit 34 located at the host 20, the customer 22 may also have a locally located storage unit 34' that is the same as that in the array 33 at the host 20. Such a locally located storage unit 34' is continuously synchronized with the device 98.

In addition to having a host 20, there may be a second host 136 located remotely from the host 20. The second host 136 may be a mirrored host having all of the same information stored within its array 33' as in the array of the host 20. The second host 136 may be connected through a direct connection 142 to the host 20. This direct connection 142 may be separate from the internet 38 provided the second host 136 is in a location that provides the ability to have a direct connection 142 apart from the internet 38. In other instances, the connection 148 to the second host 142 may be through the internet 38. The second host 136 also has an intermittently connected computer 148 that connects to the array 33' via a switch 150. Thus, the second host 136 may have an air-gapped area 30' that functions as the air-gapped area 30 at the host 20.

It is understood that while certain aspects of the disclosed subject matter have been shown and described, the disclosed subject matter is not limited thereto and encompasses various other embodiments and aspects. No specific limitation with respect to the specific embodiments disclosed herein is intended or should be inferred. Modifications may be made to the disclosed subject matter as set forth in the following claims.

What is claimed is:

1. A method of secure data transfer and storage between a host and a customer, said method comprising:
   said host providing an intermittently gapped host computer in a secure location, said intermittently gapped host computer selectively isolated from any network;
   said host providing a storage unit in said secure location, said storage unit isolated from any network outside of said host;
   providing a secure connection between said intermittently gapped host computer and a customer computer;
   serializing said storage unit;
   said customer encrypting and transferring sensitive information from said customer computer to said intermittently gapped host computer via a secure connection;
   disconnecting said intermittently gapped host computer from said secure connection; and
   said host transferring said encrypted sensitive information from said intermittently gapped host computer to said storage unit having a serial number corresponding to said customer while said intermittently gapped host computer is disconnected from said secure connection and any network outside of said host.

2. The method of secure data transfer in claim 1, wherein said secure connection is over an internet.

3. The method of secure data transfer in claim 1, wherein said storage unit is in an array including other storage units and said intermittently connected host computer is selectively connected to said storage unit.

4. The method of secure data transfer in claim 3, wherein said array is in an air-gapped area.

5. The method of claim 1, wherein a switch is located in a connection between said intermittently connected host computer and said storage unit, said switch open when said intermittently connected host computer is connected to said secure connection and said switch being closed only when said intermittently connected host computer is not connected to said secure connection.

6. The method of claim 5, wherein said secure connection to said intermittently connected host computer may be connected and disconnected with a switch.

7. A method of secure data transfer and storage for sensitive information comprising the steps of:
   providing an intermittently gapped host computer in a secure location, said intermittently gapped host computer selectively connectable to an internet connection;
   said host providing a storage unit in said secure location, said storage unit isolated from any network outside of said host;
   a customer computer being connectable to said intermittently gapped host computer via said internet connection;
   assigning a unique serial number to said storage unit;
   encrypting said sensitive information on said customer computer;
   connecting said customer computer to said intermittently gapped host computer via said internet connection and transferring said encrypted sensitive information to said intermittently gapped host computer;
   maintaining a database storing customer information and said unique serial number corresponding to said storage unit;
   disconnecting said intermittently gapped host computer from said internet connection and transferring said sensitive information from said intermittently gapped host computer to said storage unit only when said intermittently gapped host computer is disconnected from said internet connection.

8. The method of claim 7, wherein said intermittently connected host computer is selectively connected to said internet connection with a switch, disconnecting said switch providing an air-gap when said switch is open.

9. The method of claim 7, wherein said storage unit is in an array including other storage units and said intermittently connected host computer is selectively connected to said storage unit.

10. The method of claim 9, wherein said array is in an air-gapped area.

11. The method of claim 7, wherein a switch is located in a connection between said intermittently connected host computer and said storage unit, said switch open when said intermittently connected host computer is connected to said internet connection and said switch being closed only when said intermittently connected host computer is not connected to said internet connection.

* * * * *